United States Patent [19]

Hill

[11] 4,073,040

[45] Feb. 14, 1978

[54] MACHINE FOR PROCESS OF POULTRY GIZZARDS

[76] Inventor: Carl J. Hill, Rte. 2, Ball Ground, Ga. 30107

[21] Appl. No.: 604,165

[22] Filed: Aug. 13, 1975

[51] Int. Cl.² .......................................... A22C 17/14
[52] U.S. Cl. ........................................ 17/43; 17/11
[58] Field of Search ...................... 17/11, 58, 43, 45

[56] References Cited

U.S. PATENT DOCUMENTS

| | | | |
|---|---|---|---|
| 2,663,899 | 12/1953 | Biddinger et al. | 17/11 |
| 2,695,418 | 11/1954 | Patterson et al. | 17/11 |
| 3,076,998 | 2/1963 | Harben, Jr. et al. | 17/11 |
| 3,187,376 | 6/1965 | Laws | 17/58 |
| 3,406,425 | 10/1968 | Hill | 17/11 |
| 3,480,991 | 12/1969 | Edwards, Sr. | 17/11 |
| 3,579,714 | 5/1971 | Edwards, Sr. | 17/11 |
| 3,990,128 | 11/1976 | Van Mil | 17/43 |

*Primary Examiner*—Louis G. Mancene
*Assistant Examiner*—Paul J. Hirsch
*Attorney, Agent, or Firm*—Darbo & Vandenburgh

[57] ABSTRACT

The poultry gizzard with the gut and stomach attached descends along a chute having a slot through which the gut hangs from the gizzard. Below the lower end of the chute are a pair of rolls having the tops rotating toward each other. These rolls have interengaging gears at each end with spaced, ribbed intermediate portions. The first pair of gears detaches the gut and the second pair of gears detaches the stomach. A second pair of rolls coaxial with the first pair have their upstream portions spaced apart and interengaging gears at the far end. These rolls rotate so that their tops move away from each other. A rotary cutting knife extends upwardly through the space between the first portions of the second pair of rolls. Downstream from the second pair of rolls are rails to receive the split and opened gizzard. A cleaning spray is directed upwardly through the rails. At the far end of the rails are a pair of peeling rolls positioned at right angles to the rails.

21 Claims, 4 Drawing Figures

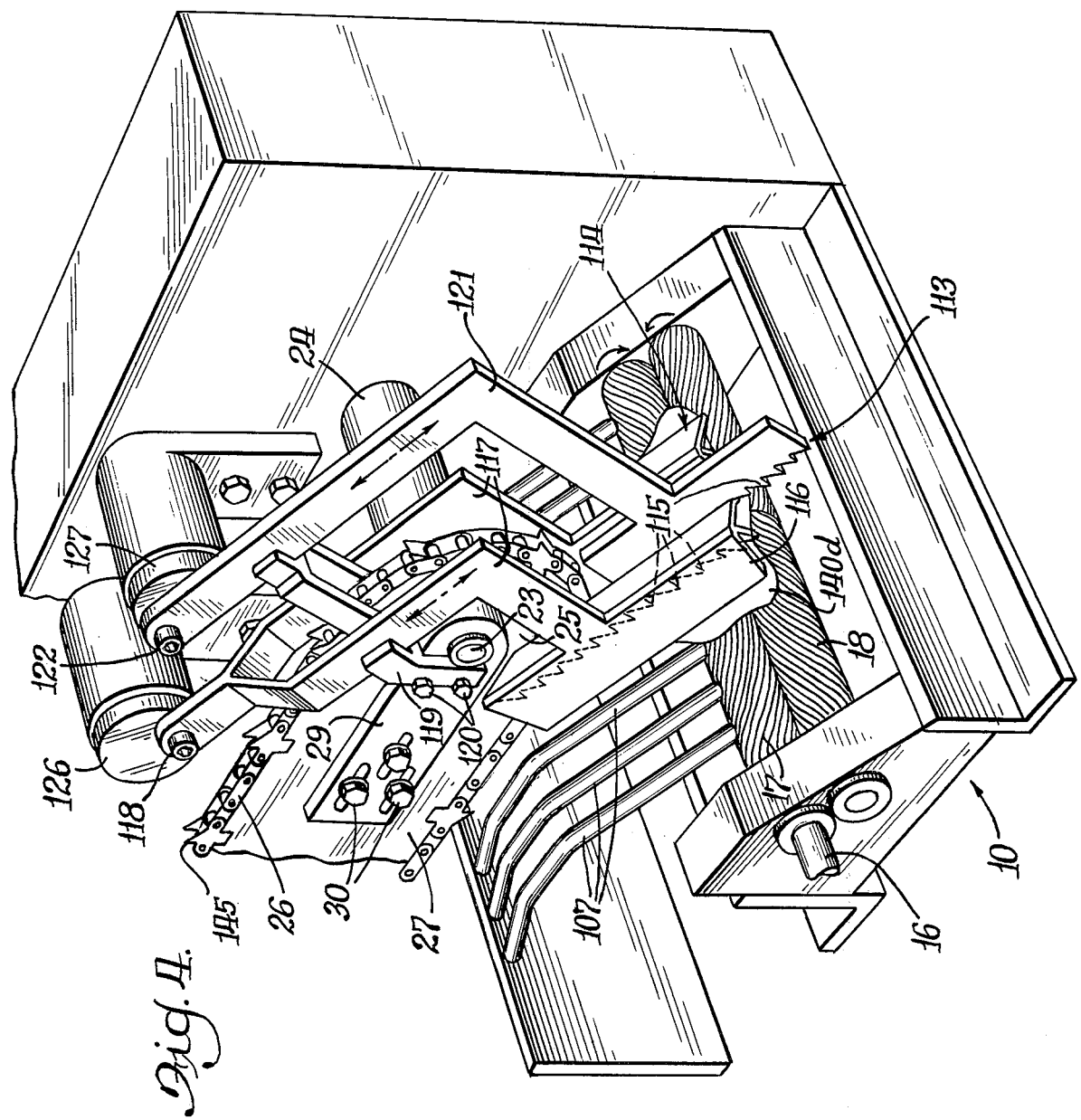

MACHINE FOR PROCESS OF POULTRY GIZZARDS

SUMMARY OF THE INVENTION

The present invention relates to improvements on poultry gizzard processing machines to make them more efficient, to reduce the volume of water employed and thus the water disposal problem, to render the machines more compact, to make them more reliable and to reduce the amount of operator attention necessary during the operation of the machine. The machine employs two pairs of rolls coaxially positioned. The first pair of rolls detaches the gut and stomach. The second pair of rolls holds the gizzard taut for effective cutting by a rotary knife and removes at least part of the contents of the gizzard. The gizzard is then flushed from below and pressed into contact with the top of a pair of peeling rolls for efficient removal of the gizzard lining.

DESCRIPTION OF THE DRAWINGS

FIG. 4 is a fragmentary isometric view.

DESCRIPTION OF SPECIFIC EMBODIMENT

Figure 1:
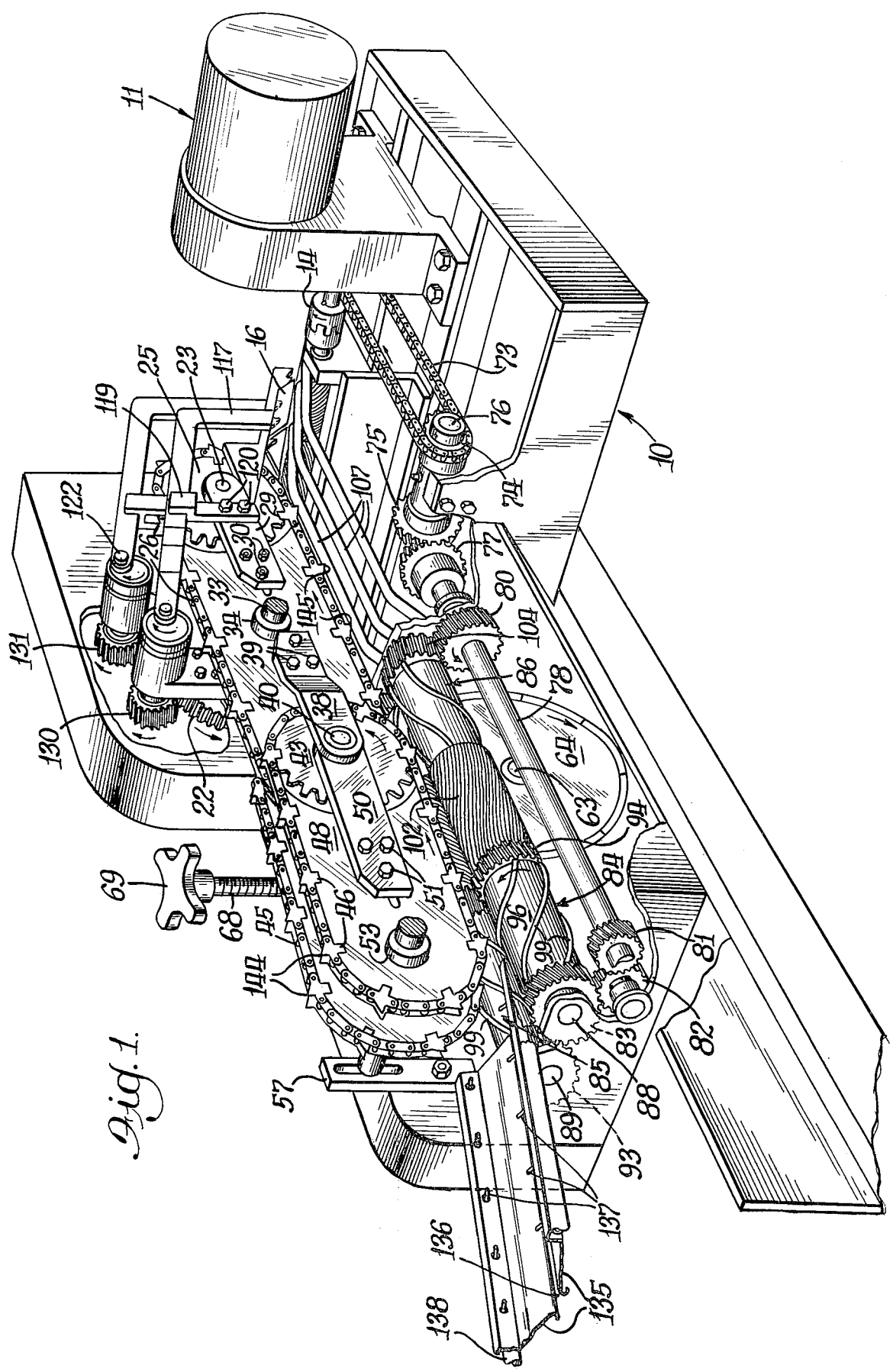
FIG. 1 is an isometric view of an embodiment of the invention with portions broken away.

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements.

The illustrated embodiment includes a frame, generally 10, on which is a gear head, variable speed electric motor drive, generally 11. Secured to the output shaft 12 of the drive are a sprocket 13 and a coupling 14. The coupling 14 is also connected to a rotatable shaft 16 forming a part of peeling roll 17. Peeling roll 17 has helical teeth which interengage with similar teeth on a second peeling roll 18 rotatably mounted in frame 10. Such peeling rolls are known and will not be further described. Shaft 16 of peeling roll 17 also carries a gear 19 and a vee-belt pulley 20.

Gear 19 meshes with a gear 22 secured to a shaft 23. Shaft 23 is journaled in a sleeve 24 forming a part of frame 10. A sprocket 25 also is affixed to shaft 23. Sprocket 25 drives a chain 26 which is carried on a guide plate 27. A pair of mounting arms 28 and 29 are journaled on shaft 23 and are secured to guide plate 27 by bolts 30. A rod 33 also extends through guide plate 27. The guide plate has a pair of collars 34 through which rod 33 extends with setscrews in the collars engaging the rod. The ends of rod 33 are threaded and extend through vertical slots in posts 35. The threaded ends have nuts 36 thereon to maintain the desired elevation of rod 33, guide plate 27 and chain 26.

A pair of arms 38 are secured to guide plate 27 by bolts 39. A shaft 40 is journaled in arms 38 and has three sprockets 41, 42, 43 secured thereto. Chain 26 is mounted on sprocket 42. Chains 45 and 46 are mounted on sprockets 41 and 43, respectively. Chains 45 and 46 are carried by guide plates 47 and 48. Mounting arms 49 and 50 are secured to guide plates 47 and 48 by bolts 51. Arms 49 and 50 are journaled on shaft 40. Guide plates 47 and 48 also have collars 52 and 53. These collars are attached to mounting rod 54 by means of setscrews 55. The ends of rod 54 are threaded to receive nuts 56 by means of which the rod is held in place on vertically slotted posts 57.

Pulley 20 on shaft 16 drives a vee-belt 61 which in turn drives a pulley 62. Pulley 62 is secured to a shaft 63 as is slitting knife 64. Shaft 63 is journaled in a sleeve 65 which is unitary with a movable mounting plate 66. Angle members 67 forming a part of frame 10 define ways which permit vertical movement of plate 66, while otherwise holding it in position. A screw 68 is rotatably attached to guide plate 66 and threaded in frame 10. At its upper end screw 68 carries a handle 69 by which it may be rotated. Thus, knife 64 may be moved vertically in frame 10.

Sprocket 13 drives a chain 73 which in turn drives a sprocket 74. Sprocket 74 and a gear 75 are attached to a shaft 76 rotatably mounted on frame 10. Gear 75 drives a gear 77 fixed to a shaft 78. Shaft 78 is journaled in frame 10 and drives two additional gears 80 and 81. Gear 81 drives an idler gear 82 which in turn drives gear 83 forming a part of a roll, generally 84. Roll 84 is one of a first pair of rolls, the other of the first pair being designated generally 85. This first pair of rolls are coaxial with a second pair of rolls, generally 86 and 87. The rolls of each pair are identical except for being lefts and rights. Rolls 84 and 86 are journaled on shaft 88 and rolls 85 and 87 are journaled on shaft 89. The shafts are a stationary part of the frame.

Figure 3:
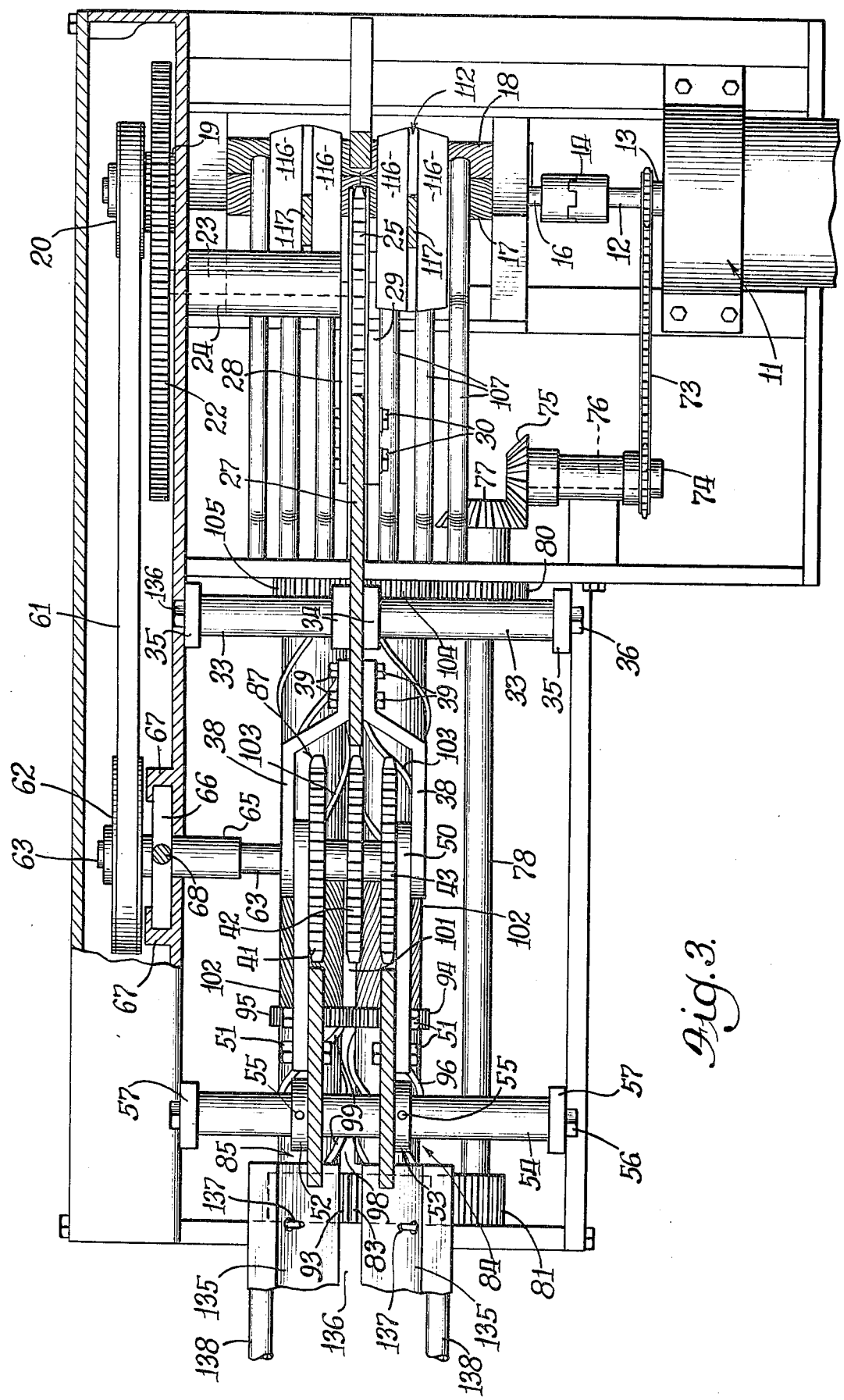
FIG. 3 is a plan view with portions broken away.

Gear 83 meshes with and drives gear 93 of roll 85. Rolls 84 and 85 also include meshing gears 94 and 95 and intermediate portions 96 and 97. The intermediate portions are sufficiently small in diameter so as to define a gap 98 therebetween (FIG. 3). The intermediate portions have helical ribs 99 thereabout.

The second pair of rolls, generally 86, 87, likewise have three distinct portions. The diameter of the first two portions is such that a gap 101 exists therebetween. It is through this gap that the cutting blade 64 extends. The first portions 102, 103 have closely positioned, helically arranged ribs 102 thereabout. The intermediate portions have widely spaced, helically arranged ribs 103. The rearwardly or downstream portions are formed by interengaging gears 104 and 105. Gear 104 is engaged by gear 80. Because of the absence of the idler 82, the second pair of rolls rotate in the direction opposite to that of the first pair of rolls.

Between the downstream end of the second pair of rolls and the peeling rolls 17, 18, are a plurality of rails 107. These extend longitudinally of the path of movement (determined by chains 26, 45, 46) and are spaced apart transversely of that path. Spray heads or nozzles 108 direct a spray 109 of flushing liquid up through the gaps between the rails.

Pusher bars, generally 112-114, reciprocate over the downstream end of the rails 107 and the top of peeling rolls 17, 18. The underside of the bars form a plurality of teeth 115 to engage the gizzard. In addition, the outside bars 112 and 114 have downwardly slanting wings 116 at each side of the teeth to aid in flattening the gizzard. A pair of arms 117 extend from pusher bars 112 and 114 to a crankpin 118. These arms rest on supports 119 secured to arms 29 by bolts 120. An arm 121 extends from pusher bar 113 to crankpin 122. This arm rests on a support 123 which is integral with support 119. The supports prevent the pusher bars from contacting the peeling rolls when a gizzard is not present therebetween.

Crankpins 118 and 122 are secured to wheels 126 and 127. These wheels are attached to shafts 128 and 129 which also carry gears 130 and 131. The latter two gears engage gear 22 and are driven thereby.

The gizzards are introduced into the machine through an in-feed trough 135, which slants towards the machine. The discharge end of the trough extends just over the gears 83, 93. A slot 136 extends longitudinally down the length of the trough. The sides of the trough slope downwardly toward the slot. Along the outside of the slot are a plurality of water discharge tubes 137 communicating with water supply manifolds 138.

OPERATION

Figure 2:
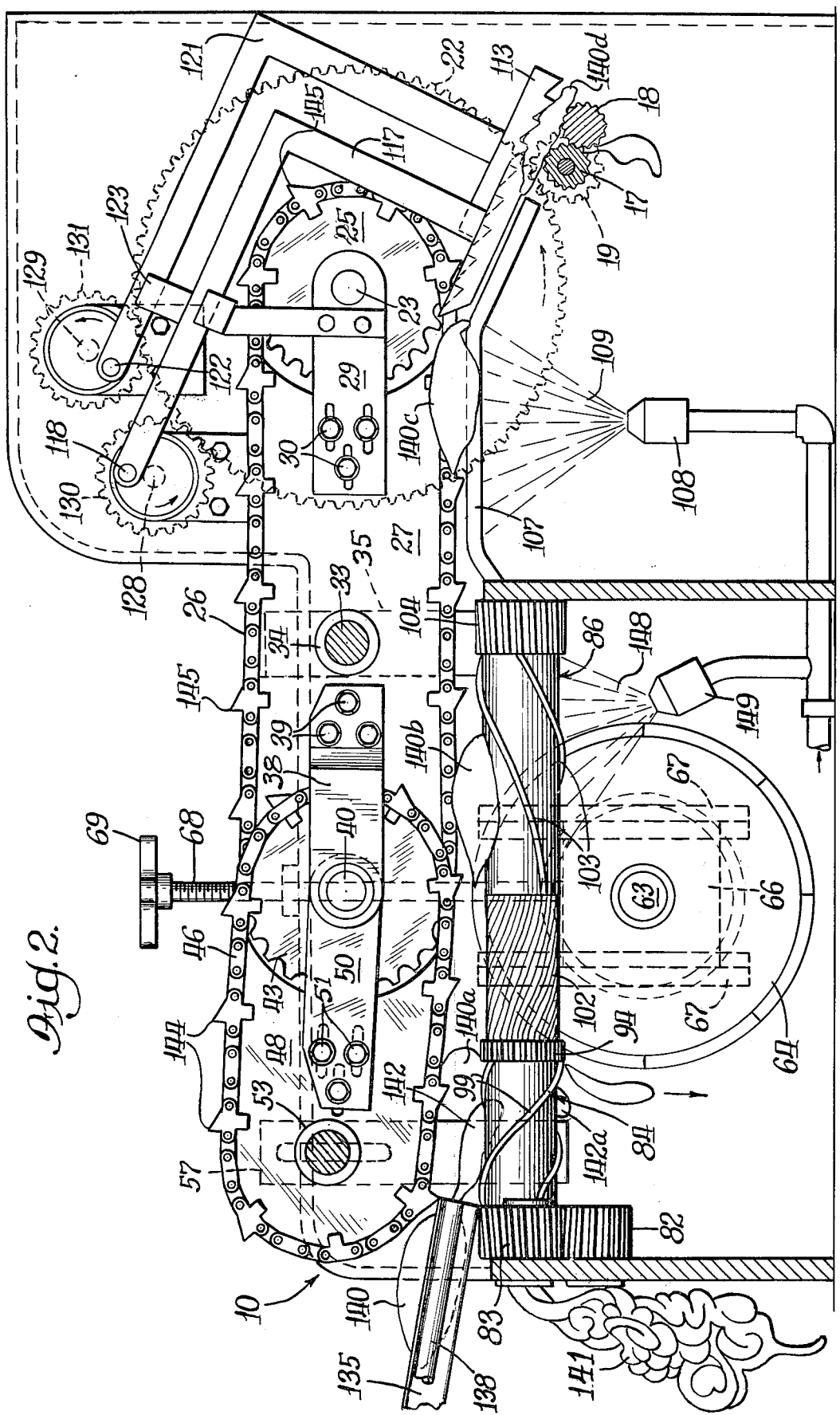
FIG. 2 is a longitudinal section.

Upon being removed from the poultry carcass the gizzard 140 has the gut (intestine) 141 and the stomach 142 attached thereto. All this is dropped into the trough 135. The water from discharge tubes 137 provides a rinsing function as well as a lubricant and force to aid in causing the assemblage to slide down the trough. The slot 136 in the trough is sufficiently large to permit the gut 141 to descend therethrough (as best seen in FIG. 2), but is sufficiently small so that the gizzard 140 and the stomach 142 remain on top of the trough. Upon approaching the end of the trough, the gut 141 is engaged by gears 83, 93. The tops of these gears are moving toward each other and descending at the nip between the gears, thus they apply a downward pulling force on the engaged gut. Since the gizzard 140 cannot move downwardly, the gut is pulled away from the gizzard and broken free (detached).

As the gizzard and stomach move away from the trough and onto the first pair of rolls 84, 85, the stomach 142 descends through the gap 98 between these rolls. This descent into the gap is aided by the ribs 99 of the rolls. At about the same time, the gizzard is engaged by the projections 144 of chains 45, 46 and is moved downstream (to the right in the drawings) across the rolls. The rolls apply a downward pulling force on the stomach which aids in orienting the gizzard on the rolls. Additionally, the upper part of the gizzard is trapped between chains 45, 46 so that the gizzard is centered above the rolls. As the gizzard and stomach are about at the position at which they are designated 140a and 142a, the stomach is engaged by gears 94, 95 and pulled downwardly so that it is broken free of the gizzard (detached).

The tops of the second pair of rolls are moving away from each other, thus the ribs 102 draw the underside of the gizzard taut. This aids in the slitting of the gizzard by knife 64 as the gizzard continues its downstream movement. The knife 64 does not fully sever the two halves of the gizzards, but the sides remain attached to each other. Upon being slit, the rolls move the separated lower sides of the gizzard away from each other. The ribs 103 perform an initial scraping action on the interior of the gizzard to remove a substantial portion of the contents of the gizzard. This action is continued by the teeth (which form ribs) of gears 104, 105. This initial "dry" cleaning reduces the overall water consumption, and thus water disposal. If desired, a small quantity of water may be employed to keep the second pair of rolls clean and aid in their cleaning out the gizzard. This would be done by projecting a spray 148 from spray head 149 onto the bottom of the rolls and up through slot 101.

Before leaving the second pair of rolls the gizzard is engaged and propelled by projections 145 of chain 26. By the time it moves off of the second pair of rolls the gizzard has been spread out relatively flat with the interior of the gizzard exposed and substantially cleaned. The thus flattened gizzard, illustrated at 140c, moves across rails 107. Here it is flushed by spray 109. Upon approaching the downstream end of the rails the gizzard is engaged by teeth 115 of pusher bars 112-114. These pusher bars move a gizzard onto and across the peeling rolls 17, 18. Here the lining 146 (i.e., the interior membrane of the gizzard) is detached from the gizzard 140d. Ultimately, the processed gizzard falls from the far side of peeling roll 18 into a suitable container or onto a discharge conveyor.

In some embodiments, the gears 94, 95 may be eliminated. The result will be that, at this stage, there is no detachment of the stomach from the gizzard. However, upon arrival at the peeling station, the stomach will be detached. That is, it is sufficiently small so that it descends between the peeling rolls which then apply a pulling force on the stomach to detach it from the gizzard.

I claim:

1. In a machine for processing a poultry gizzard having the stomach attached thereto and comprising a first device at a first station for detaching the stomach, a second device including a blade rotating on a shaft at a second station for slitting one side of the gizzard, a third device at a third station for separating the sides of the gizzard at said split to expose the interior of the gizzard, means for moving the gizzard sequentially from the first to the third station, and power means for operating said devices, the improvement comprising:

said first device comprising a first pair of rolls, each having an axis, positioned in juxtaposition with their axes parallel and approximately horizontal, said power means rotating said rolls in directions such that the tops thereof are turning toward each other;

said third device comprising a second pair of rolls, each having an axis, positioned in juxtaposition with their axes parallel and approximately horizontal, the rolls of the second pair being coaxial with the rolls of the first pair, said power means rotating the second pair of rolls in directions such that the tops thereof are turning away from each other;

said blade shaft being below said second pair of rolls with the blade extending upwardly between the second pair of rolls at least to the elevation of the tops thereof; and said moving means having a portion above the rolls and generally parallel to said axes and engaging the gizzard to move the gizzard parallel to the axes and hold the gizzard against the tops of said rolls.

2. In a machine as set forth in claim 1, wherein said first pair of rolls each have two portions, the upstream portions defining a space therebetween sufficiently wide to permit the stomach to pass therebetween and sufficiently small to block the gizzard from passing therebetween and having ribs thereon, the downstream portions having interengaging gearlike teeth for engaging the stomach and pulling it from the gizzard.

3. In a machine as set forth in claim 2, wherein the second pair of rolls have rib means thereon for engaging the gizzard to initially draw the bottom of the gizzard taut as it is being cut, to move the cut sides away from each other after cutting and then to displace contents from the interior of the gizzard.

4. In a machine as set forth in claim 3, wherein said moving means at said portion thereof comprises a pair of endless chains moving in generally parallel paths aligned with said axes, and spaced at opposite sides of a vertical plane between the rolls, said chains having projections thereon to engage said gizzard.

5. In a machine as set forth in claim 4, wherein the moving means includes a horizontal shaft between the ends of the second pair of rolls, three sprockets mounted on said shaft, one of the sprockets being in said plane and the other two sprockets being at opposite sides of said one sprocket, said chains being respectively mounted on the other two sprockets, and a third endless chain mounted on said one sprocket and extending downstream in said plane, said third chain having projections thereon to engage said gizzard.

6. In a machine as set forth in claim 5 and wherein the machine includes spray means at a fourth station for flushing the interior of the gizzard with the moving means moving the gizzard from the third to the fourth station, the further improvement comprising:
a plurality of spaced rails at said fourth station, said rails being generally parallel to said axes and having upstream ends approximately at the level of the tops of the second pair of rolls, so that the spread gizzard moves from the third station onto the rails in spread condition,
said spray means directing a spray upwardly through the rails from below,
said third chain being at an elevation above said rails and parallel thereto for moving said spread gizzards along said rails.

7. In a machine as set forth in claim 6 and wherein the machine includes a fourth device at a fifth station for removing the lining from the interior of the gizzard and comprising a pair of peeling rolls having parallel axes, with the moving means moving the gizzard to the fifth station, the further improvement comprising:
said rails extending to said fifth station;
at said fifth station said moving means comprising a pair of pusher bars having teeth on the underside thereof and movable along paths generally parallel to said rails, said bars extending above the downstream end of said rails and above portions of said peeling rolls, and driving means connected to said power means and to said bars for reciprocating said bars along said paths thereof with the reciprocating movement of one bar being out of phase with the reciprocating movement of the other bar.

8. In a machine as set forth in claim 3, wherein said second pair of rolls include gears on each roll at the downstream end thereof, said gears engaging each other.

9. In a machine as set forth in claim 3 and wherein the machine includes spray means at a fourth station for flushing the interior of the gizzard with the moving means moving the gizzard from the third to the fourth station, the further improvement comprising:
a plurality of spaced rails at said fourth station, said rails being generally parallel to said axes and having upstream ends approximately at the level of the tops of the second pair of rolls, so that the spread gizzard moves from the third station onto the rails in spread condition,
said spray means directing a spray upwardly through the rails from below.

10. In a machine as set forth in claim 9 and wherein the machine includes a fourth device at a fifth station for removing the lining from the interior of the gizzard and comprising a pair of peeling rolls having parallel axes, with the moving means moving the gizzard to the fifth station, the further improvement comprising:
said rails extending to said fifth station;
at said fifth station said moving means comprising a pair of pusher bars having teeth on the underside thereof and movable along paths generally parallel to said rails, said bars extending above the downstream end of said rails and above portions of said peeling rolls, and driving means connected to said power means and to said bars for reciprocating said bars along said paths thereof with the reciprocating movement of one bar being out of phase with the reciprocating movement of the other bar.

11. In a machine as set forth in claim 1 and wherein the machine includes spray means at a fourth station for flushing the interior of the gizzard with the moving means moving the gizzard from the third to the fourth station, the further improvement comprising:
a plurality of spaced rails at said fourth station, said rails being generally parallel to said axes and having upstream ends approximately at the level of the tops of the second pair of rolls, so that the spread gizzard moves from the third station onto the rails in spread condition,
said spray means directing a spray upwardly through the rails from below.

12. In a machine as set forth in claim 11 and wherein the machine includes a fourth device at a fifth station for removing the lining from the interior of the gizzard and comprising a pair of peeling rolls having parallel axes, with the moving means moving the gizzard to the fifth station, the further improvement comprising:
said rails extending to said fifth station;
at said fifth station said moving means comprising a pair of pusher bars having teeth on the underside thereof and movable along paths generally parallel to said rails, said bars extending above the downstream end of said rails and above portions of said peeling rolls, and driving means connected to said power means and to said bars for reciprocating said bars along said paths thereof with the reciprocating movement of one bar being out of phase with the reciprocating movement of the other bar.

13. In a machine as set forth in claim 12, wherein said peeling rolls have their axes approximately normal to said rails, and there are three of said pusher bars, the two outside bars reciprocating in unison and having downwardly extending wings at opposite sides of the teeth thereof for holding said gizzard relatively flat in said peeling rolls.

14. In a machine as set forth in claim 1 and for use wherein the gizzard has the gut attached thereto, the further improvement comprising:
a feed trough extending upstream from said first pair of rolls, said trough having a slot therein sufficiently wide to permit the gut to descend therethrough and sufficiently narrow to prevent the gizzard and stomach from passing therethrough;
said first pair of rolls including a pair of gears at the upstream end thereof and engaging each other, said gears being below the downstream end of said trough, said gears defining a nip lying in a vertical plane which also includes said slot;
whereby as the gizzard moves down the trough, the gut hangs below the trough and upon reaching said gears is engaged by the gears and pulled away from the gizzard.

15. A machine for processing a poultry gizzard having the stomach and gut attached thereto, said machine comprising:
a feed trough, said trough having a slot therein sufficiently wide to permit the gut to descend therethrough and sufficiently narrow to prevent the gizzard and stomach from passing therethrough;
a first pair of rolls, each having an axis, positioned in juxtaposition with their axes parallel and approximately horizontal, said power means rotating said rolls in directions such that the tops thereof are turning toward each other, a pair of gears at the upstream end thereof and engaging each other at a nip, said nip being positioned so that a vertical plane extending through said slot also includes said nip, said gears being below the downstream end of said trough, a second pair of gears at the downstream end of said rolls and engaging each other, said rolls intermediate said pairs of gears defining a slot therebetween sufficiently wide to permit the stomach to pass through and sufficiently small to block the gizzard from passing therebetween;
whereby as the gizzard moves down the trough, the gut hangs below the trough and upon reaching said first mentioned gears is engaged by the gears and pulled away from the gizzard and after the stomach and gizzard move onto the rolls the stomach descends between the rolls and is pulled off by the second pair of gears.

16. A machine as set forth in claim 15,
including means to move the gizzard along the trough and across the rolls, and
wherein said intermediate parts of said rolls have ribs thereon.

17. In an apparatus for cleaning and removing the lining from a split poultry gizzard and including power means, spray means for flushing the interior of the gizzard, a pair of peeling rolls having parallel axes, and conveying means, the improvement comprising:
a plurality of spaced, generally horizontal and generally parallel, rails having upstream ends and downstream ends;
means for positioning said split gizzard on said rails at the upstream ends with the gizzard spread out and with the interior thereof facing the rails;
said spray means directing a spray upwardly through the rails from below;
said peeling rolls being positioned at the downstream end of the rails to receive the gizzard as it leaves the rails; and
said conveying means being positioned to engage the gizzard above the rails and peeling rolls and to move the gizzard across the rails and onto the peeling rolls, said conveying means including a pair of pusher bars having teeth on the underside thereof and movable along paths generally parallel to said rails, said bars extending above the downstream end of said rails and above portions of said peeling rolls, and driving means connected to said power means and to said bars for reciprocating said bars along said paths thereof with the reciprocating movement of one bar being out of phase with the reciprocating movement of the other bar.

18. In a machine as set forth in claim 17, wherein said peeling rolls have their axes approximately normal to said rails, and there are three of said pusher bars, the two outside bars reciprocating in unison and having downwardly extending wings at opposite sides of the teeth thereof for holding said gizzard relatively flat in said peeling rolls.

19. In a machine as set forth in claim 18, wherein said means for positioning said gizzards includes a pair of cleaning rolls positioned at the upstream ends of said rails, said rolls having ribs thereon, said cleaning rolls being connected to said power means for rotation in directions such that the upper parts of said rolls move away from each other, said conveying means holding the gizzard against said cleaning rolls and moving it in the direction of said rails.

20. In an apparatus for cleaning and removing the lining from a split poultry gizzard and including power means, spray means for flushing the interior of the gizzard, a pair of peeling rolls having parallel axes, and conveying means, the improvement comprising:
a plurality of spaced, generally horizontal and generally parallel, rails having upstream ends and downstream ends;
means for positioning said split gizzard on said rails at the upstream ends with the gizzard spread out and with the interior thereof facing the rails, said means for positioning said gizzards including a pair of cleaning rolls positioned at the upstream ends of said rails, said rolls having ribs thereon, said cleaning rolls being connected to said power means for rotation in directions such that the upper parts of said rolls move away from each other, said conveying means holding the gizzard against said cleaning rolls and moving it in the direction of said rails;
said spray means directing a spray upwardly through the rails from below;
said peeling rolls being positioned at the downstream end of the rails to receive the gizzard as it leaves the rails; and
said conveying means being positioned to engage the gizzard above the rails and peeling rolls and to move the gizzard across the rails and onto the peeling rolls.

21. In a machine as set forth in claim 20, wherein said cleaning rolls include gears on each roll at the downstream end thereof, said gears engaging each other.

* * * * *